United States Patent
Saripalli

(10) Patent No.: US 7,921,253 B2
(45) Date of Patent: Apr. 5, 2011

(54) CACHE COHERENT SWITCH DEVICE

(75) Inventor: Ramakrishna Saripalli, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/764,273

(22) Filed: Apr. 21, 2010

(65) Prior Publication Data
US 2010/0205380 A1   Aug. 12, 2010

Related U.S. Application Data

(63) Continuation of application No. 11/888,157, filed on Jul. 31, 2007, now Pat. No. 7,734,857.

(51) Int. Cl.
*G06F 13/36* (2006.01)

(52) U.S. Cl. ........................................ 710/311; 711/141

(58) Field of Classification Search .......... 711/141–146; 710/311–315
See application file for complete search history.

(56) References Cited

U.S. PATENT DOCUMENTS

| | | | |
|---|---|---|---|
| 6,009,488 A | 12/1999 | Kavipurapu | 710/105 |
| 6,529,968 B1 | 3/2003 | Anderson | 710/22 |
| 7,480,770 B2 | 1/2009 | Zeffer et al. | 711/141 |
| 2009/0006668 A1 | 1/2009 | Vasudevan et al. | 710/33 |

*Primary Examiner* — Clifford H Knoll
(74) *Attorney, Agent, or Firm* — Trop, Pruner & Hu, P.C.

(57) ABSTRACT

In one embodiment, the present invention includes a switch device to be coupled between a first semiconductor component and a processor node by interconnects of a communication protocol that provides for cache coherent transactions and non-cache coherent transactions. The switch device includes logic to handle cache coherent transactions from the first semiconductor component to the processor node, while the first semiconductor component does not include such logic. Other embodiments are described and claimed.

19 Claims, 4 Drawing Sheets

CACHE COHERENT SWITCH DEVICE

This application is a continuation of U.S. patent application Ser. No. 11/888,157 filed Jul. 31, 2007 now U.S. Pat. No. 7,734,857 entitled "A CACHE COHERENT SWITCH DEVICE" the content of which is hereby incorporated by reference.

BACKGROUND

Communications in computer systems can occur by many different means such as different communication protocols. For example, some systems are arranged such that communications between a processor and a chipset component occur via a front side bus (FSB) according to an FSB communication protocol. Other components of the system, such as peripheral devices coupled downstream to the chipset component may communicate with the chipset component via a different protocol, such as a peripheral component interconnect (PCI) communication protocol, e.g., a multi-drop PCI communication protocol or by point-to-point (PtP) interconnects according to a PCI-Express™ communication protocol in accordance with the PCI-Express™ Base Specification version 2.0 (published Dec. 20, 2006) (hereafter the PCIe™ Specification).

Additional communication protocols are being adopted in systems to enable routing of both cache coherent communications and non-cache coherent communications. Typically, such systems include communication paths or links that operate according to multiple communication protocols, as detailed above. As such, there is the need for translations or conversions of certain transactions from one protocol to another, increasing latency of operations.

DETAILED DESCRIPTION

In various embodiments, a switch device may be coupled between a processor node and one or more semiconductor components such as peripheral devices or so forth. The switch device may enable cache coherent transactions to occur between the peripheral devices and the processor node, although the peripheral devices lack coherency logic to handle such cache coherent transactions. That is, simplified peripheral devices may be provided by different independent hardware vendors (IHVs) that can perform communications in accordance with a given communication protocol such as a point-to-point (PtP) communication protocol. In one such embodiment, the protocol may be a so-called common system interface (CSI) communication protocol as will be described below. In this way, IHV devices may be provided without the need to implement the cache coherency portions of such a protocol. Instead, the switch device may handle such cache coherent transactions for the peripheral devices.

Figure 1:
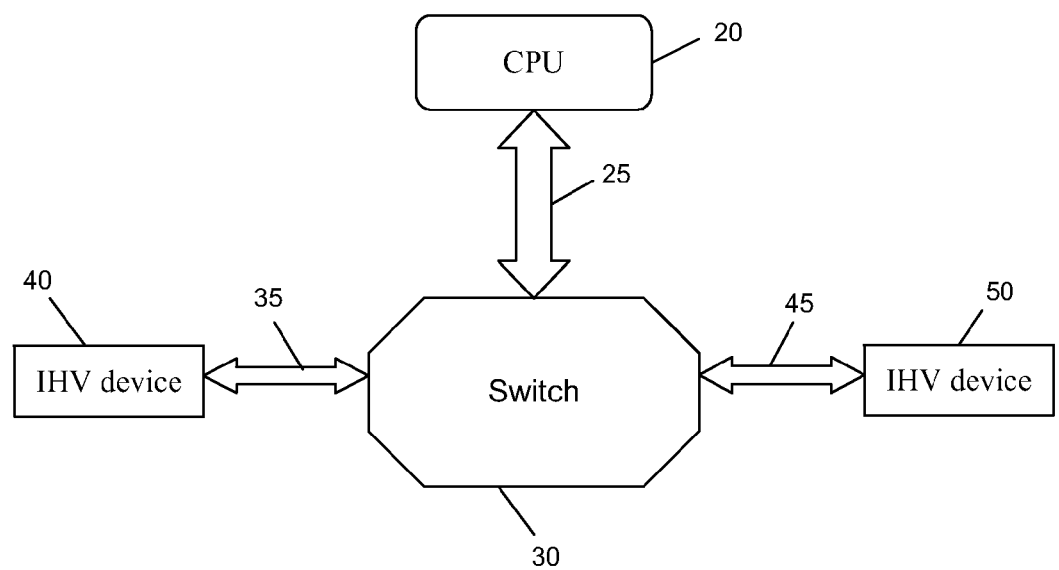
FIG. 1 is a block diagram of a system in accordance with one embodiment of the present invention.

Referring now to FIG. 1, shown is a block diagram of a system in accordance with one embodiment of the present invention. As shown in FIG. 1, system 10, which may be a single processor system, includes a processor 20, which may be a processor node including one or more cores and an integrated memory controller to handle memory transactions with a local portion of a system memory attached to the node (not shown in FIG. 1), among other such components. Processor 20 is coupled to a switch 30 by a PtP interconnect 25 which, in one embodiment may be a CSI interconnect. In turn, switch 30 may be coupled to a first IHV device 40 by a second PtP interconnect 35 and to a second IHV device 50 by a third PtP interconnect 45. In one embodiment, first IHV device 40 may be, for example, an intelligent controller while second IHV device 50 may be a graphics device, although the scope of the present invention is not limited in this regard. These IHV devices may have a form factor to enable direct coupling to the associated PtP interconnect such as by a connector, socket or other form of electromechanical interface in accordance with the physical requirements of the interconnect.

In certain embodiments, interconnections between different components of FIG. 1 may be point-to-point interconnects that provide for coherent shared memory within system 10, and in one such embodiment the interconnects and protocols used to communicate therebetween may form a common system interface (CSI). In such manner, multiple processors, memories, and other components of system 10 (not all shown in FIG. 1) may coherently interface with each other. Such a coherent system may accommodate coherent transactions without any ordering between channels through which transactions flow. While discussed herein as a coherent system, it is to be understood that both coherent and non-coherent transactions may be passed through and acted upon by components within the system. For example, regions of memory may be reserved for non-coherent transactions.

To effect communications according to a coherent protocol, devices may include multiple layers such as transaction, routing, link and physical layers. In one embodiment, a transaction layer may include various protocol engines used to form, order, and process packets for transmission through a coherent system. For example, a transaction layer may include a coherence engine, an interrupt engine, and an input/output (I/O) engine, among others. Using such engines, the transaction layer may form a packet having a system interconnect header. The packets thus formed in the transaction layer may be provided to a routing layer on a given virtual channel. In various embodiments, the routing layer may provide a flexible and distributed manner of routing coherent packets from source to destination. The destination-based routing may be determined using routing tables within the routing layer, which allows for adaptive routing and on-line reconfiguration of the routing table. From the routing layer, transactions and packets may be passed to a link layer, which in various embodiments, may be used to provide reliable data transfer and flow control between two directly connected coherent agents, and also provide for virtualizing a physical channel between the devices (e.g., into multiple message classes and virtual networks). In such manner, a physical channel may be multiplexed among multiple virtual channels. Thus the link layer may be flow controlled to prevent overflow or underflow, and may also be used to provide error detection and recovery. In various embodiments, a physical layer may be used to provide electrical transfer of information between two directly connected coherent agents via a PtP interconnect.

While shown in the embodiment of FIG. 1 as including separate IHV devices of different IHVs, understand the scope of the present invention is not limited in this regard, and in different implementations multiple IHV devices may be provided by a single source.

Furthermore, understand that the IHV devices may take many different forms. However, for purposes of embodiments of the present invention, such devices, while being able to perform non-coherent transactions using its own internal logic (i.e., internal non-coherent logic of the communication protocol), may have a simplified design structure such that they do not include logic for performing coherent transactions. Instead, when a coherent transaction is desired to be executed with the peripheral device, the coherent transaction may instead be passed to switch 30. That is, switch 30 may offload portions of a cache coherency protocol of a communication protocol to allow native devices (i.e., first IHV device 40 and second IHV device 50) to handle only non-cache coherent communications. Thus, switch 30 may perform the coherency protocol for the given communication protocol. Thus, a system such as that shown in FIG. 1 may include peripheral devices such as the IHV devices, which may be I/O devices or other such components, that are interconnected into the system using PtP interconnects of the system's communication protocol which, in one embodiment may be a CSI protocol. Thus these peripheral devices are native devices of the communication protocol. Such a system stands in contrast to a system that includes a so-called I/O hub which may be connected to a processor node by a PtP interconnect, i.e., a CSI interconnect, while peripheral devices are coupled downstream of the I/O hub by interconnects of a second protocol such as a PCI interconnect, e.g., a PCIe™ interconnect in accordance with the PCIe™ specification. In this way, all communications within system 10 of FIG. 1 may be according to a single communication protocol, e.g., of a CSI protocol, rather than having certain devices communicate according to this protocol, and other devices communicate according to another protocol, causing increased latencies due to required translations and intermediate communications. However, it is noted that in other embodiments, multiple switches and I/O hubs may be present in a single system such that some peripheral devices may be native devices, e.g., of a CSI protocol, while other peripheral devices may be coupled to an I/O hub by a different, non-native protocol. While shown with this single processor system in the embodiment of FIG. 1, understand the scope of the present invention is not limited in this regard and embodiments may be used in various multiprocessor systems.

Figure 2:
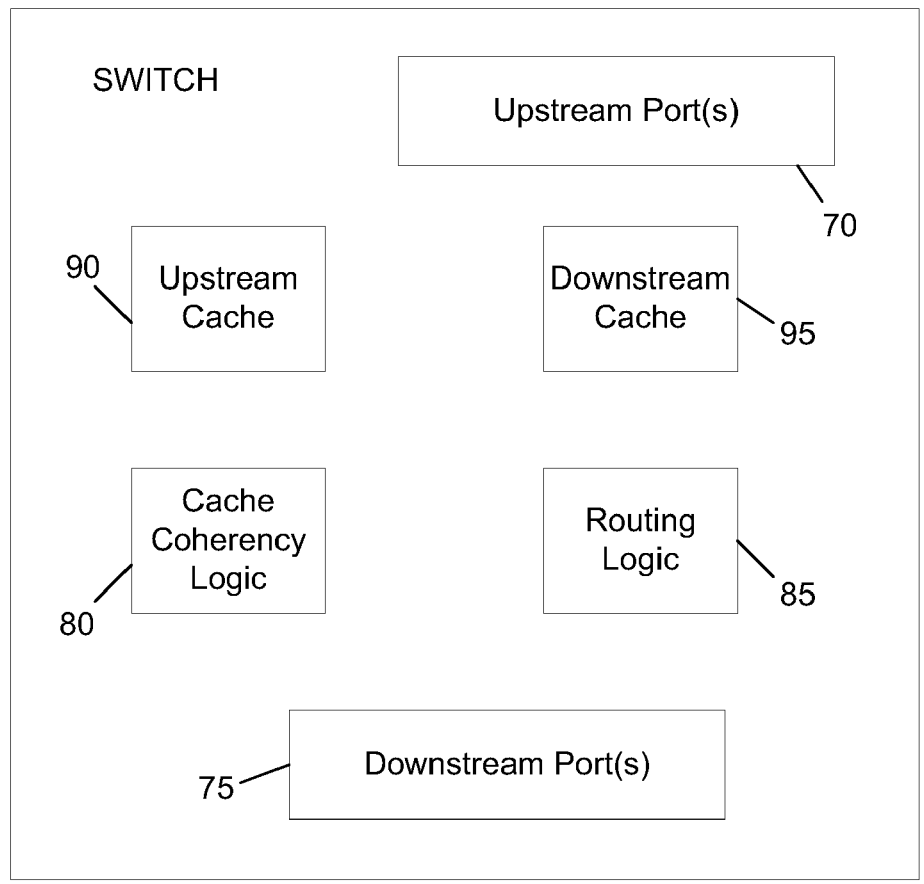
FIG. 2 is a block diagram of a switch in accordance with one embodiment of the present invention.

Referring now to FIG. 2, shown is a block diagram of a switch in accordance with one embodiment of the present invention. As shown in FIG. 2, switch 30 may include various components to enable switching operations between one or more peripheral devices coupled to the switch on a downstream side and a processor coupled to the switch on an upstream side. Specifically, as shown in FIG. 2, to handle such transactions, switch 30 may include one or more upstream ports 70 and one or more downstream ports 75. To provide for handling of transactions to and from the peripheral devices, switch 30 may further include cache coherency logic 80 and routing logic 85. Cache coherency logic 80 may be used to handle cache coherent transactions originating from the peripheral devices. For example, because many peripheral devices that can be coupled to a system do not include cache coherency logic to perform operations of a cache coherent protocol, which may include requirements for performing snoops, invalidations and so forth, cache coherency logic 80 may be provided. Such logic may thus handle these incoming cache coherent transactions by sending various coherent-related transactions from upstream port 70, such as snoop transactions, invalidation transactions, receiving and handling responses to the transactions and so forth. To this end, cache coherency logic 80 may include tables, buffers or other storage to maintain cache line states for all addresses owned by downstream devices (i.e., first and second IHV devices in the embodiment of FIG. 1).

Furthermore, switch 30 may enable peer-to-peer transactions between peripheral devices coupled thereto. More specifically, by using routing logic 75, such transactions may be passed directly through switch 30 such that the need for passing these transactions on the interconnect to the processor can be avoided, thereby reducing latencies and bandwidth on that interconnect. Still further, switch 30 may include an upstream cache 90 and a downstream cache 95. These buffers may be used to store transactions and associated data and information to enable smooth transaction flow. Accordingly, upstream cache 90 may store incoming transactions from peripheral devices that are destined for the processor (or other peer device), while downstream cache 95 may store incoming transactions from the processor(s) that are destined for the peripheral devices. While shown with these limited components in the embodiment of FIG. 2, understand that a switch in accordance with an embodiment of the present invention may include additional logic and other circuitry in various embodiments.

Figure 3:
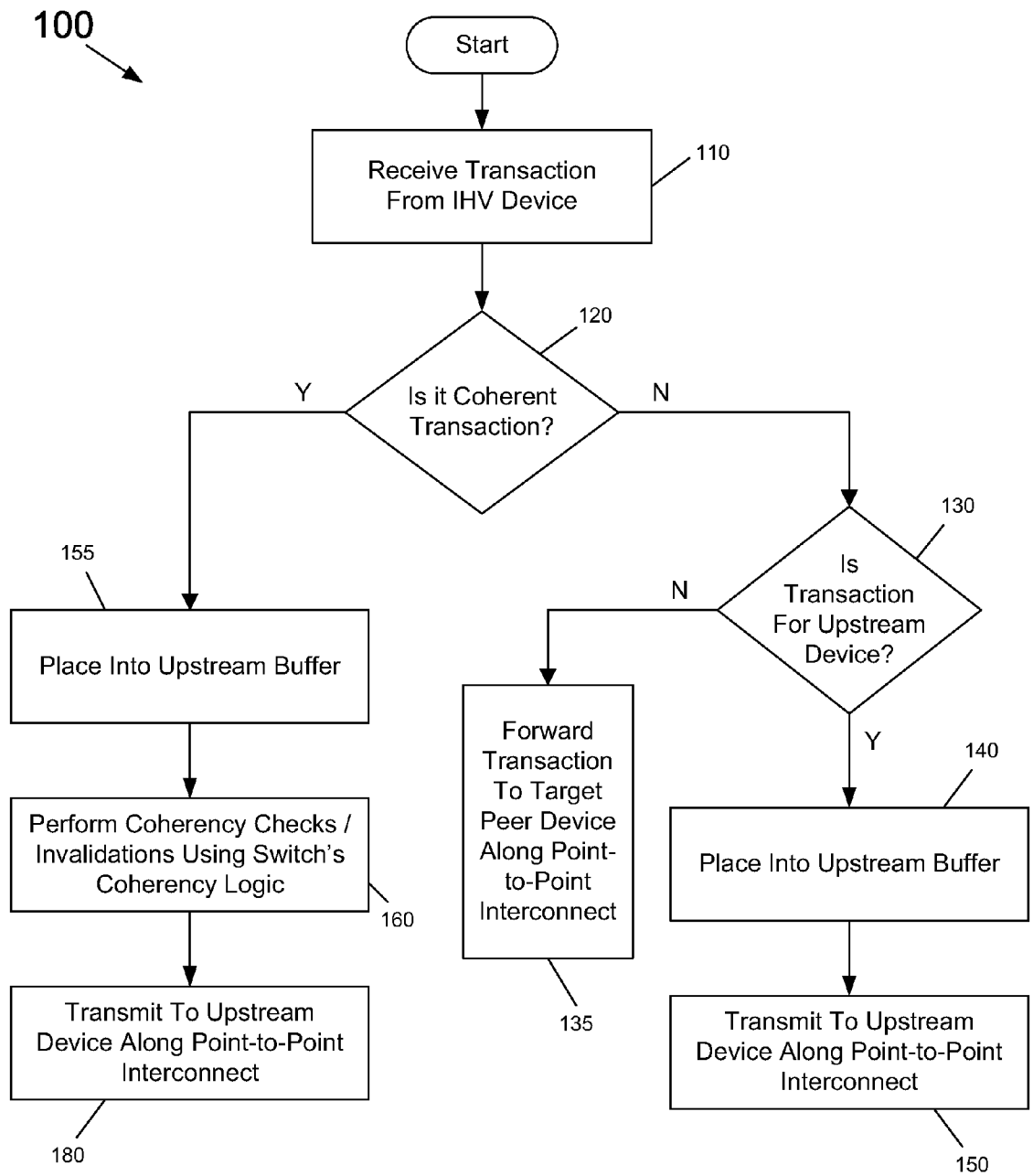
FIG. 3 is a flow diagram of a method in accordance with one embodiment of the present invention.

Referring now to FIG. 3, shown is a flow diagram of a method in accordance with one embodiment of the present invention. As shown in FIG. 3, method 100 may be performed within a switch such as that of FIG. 2 to handle incoming transactions received from peripheral devices coupled thereto. As shown in FIG. 3, method 100 may begin by receiving a transaction from an IHV device (block 110). Next, it may be determined whether the transaction is a coherent transaction (diamond 120). If not, it may next be determined whether the transaction is destined for an upstream device (diamond 130). For example, a node identifier of the transaction may be compared to a list of node identifiers in a table of the switch to determine where the transaction is destined. If the transaction is not intended for the upstream device, control may pass to block 135. At block 135, the transaction may be forwarded to an appropriate target peer device of the transaction, for example, another peripheral device coupled to the switch. In this way, bandwidth and latency may be reduced by not forwarding this transaction along the interconnect to the processor, i.e., upstream device.

Referring still to FIG. 3, if the transaction is destined for the upstream device, control passes to block 140, where the transaction is placed into an upstream buffer. Then, when bandwidth is available, the transaction may be transmitted to the upstream device along the interconnect coupled between the switch and the upstream device (block 150).

Still referring to FIG. 3, if instead it is determined that the transaction is a coherent transaction, the coherent transaction may be placed into the upstream buffer, because there may be other transactions ahead of this coherent transaction, or for other reasons, some amount of time may pass before the transaction is able to be transmitted from the buffer to the upstream device (block 155). Next, the switch may perform coherency checks using its own coherency logic (block 160). For example, such coherency checks may include snoop transactions sent from the switch to the processor node. These snoop transactions may thus snoop transactions to one or more caches of the processor to determine whether any cache transactions are for the addresses corresponding to the coherent transaction that is present in the upstream buffer.

As a result of the snoop and other cache coherency transactions, one of more cache lines in one or more processor cores may be invalidated prior to allowing the coherent transaction to pass to the upstream interconnect. After these invalidations have been performed, or it has been determined that the snooped transactions do not correspond to the address or addresses associated with the coherent transaction, the cache coherency logic in the switch may indicate that the transaction is ready for sending to the processor. Thus the switch may transmit the coherent transaction to the upstream device along the PTP interconnect (block 180). Note that these cache coherent transactions may take different forms in various embodiments. For purposes of illustration, examples of such transactions may be direct memory access (DMA) transactions to write data into a memory associated with a given processor node or read data therefrom. In particular embodiments, a so-called direct cache access (DCA) transaction may be performed to directly write or read data to or from a cache associated with a processor node (i.e., a cache memory within the processor node) without the need to forward such transactions to the associated local memory. While shown with this particular implementation in the embodiment of FIG. 3, the scope of the present invention is not limited in this regard.

Figure 4:
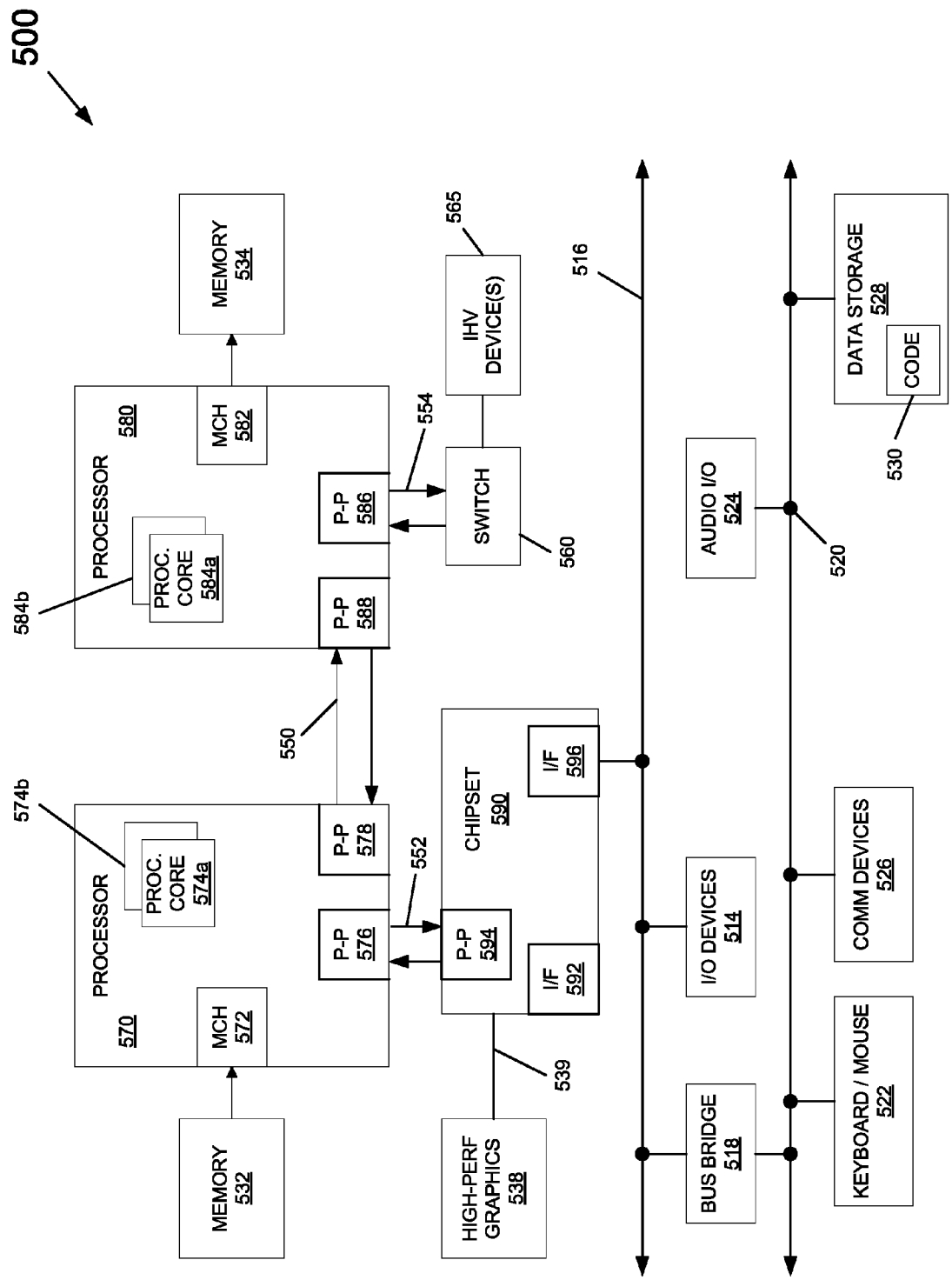
FIG. 4 is a block diagram of a system in accordance with one embodiment of the present invention.

Embodiments may be suited for many different platform types to reduce traffic between a switch and processor node along a PtP interconnect, as well as to simplify logic present in peripheral or other IHV devices. As shown in FIG. 4, multiprocessor system 500 is a point-to-point interconnect system, and includes a first processor 570 and a second processor 580 coupled via a point-to-point (P-P) interconnect 550, although the system may be of another bus architecture. As shown in FIG. 4, each of processors 570 and 580 may be multi-core processors including first and second processor cores (i.e., processor cores 574a and 574b and processor cores 584a and 584b), although other cores may be present. Still referring to FIG. 4, first processor 570 further includes a memory controller hub (MCH) 572 and PtP interfaces 576 and 578. Similarly, second processor 580 includes a MCH 582 and PtP interfaces 586 and 588. As shown in FIG. 4, MCH's 572 and 582 couple the processors to respective memories, namely a memory 532 and a memory 534, which may be portions of main memory (e.g., dynamic random access memory (DRAM)).

First processor 570 may be coupled to a chipset 590 via P-P interconnect 552. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 or a point-to-point interconnect may be used to couple graphics engine 538 to chipset 590. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

As further shown in FIG. 4, second processor 580 may be directly coupled to a switch 560 by P-P interconnects of a P-P interconnect 554. Switch 560 may be in accordance with an embodiment of the present invention to enable performing of cache coherent transactions originating from one or more IHV devices 565 coupled thereto. Specifically, as described above such IHV devices need not include complex logic to perform cache coherency transactions. Instead, a request for such transactions may simply be forwarded on to switch 560 to allow switch 560 to perform cache coherency operations and to pass the transactions on to second processor 580. Still further, switch 560 may include routing logic to pass peer transactions between different ones of IHV devices 565 without the need for sending such traffic along P-P interconnect 554. While shown with this particular implementation in the embodiment of FIG. 4, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a switch device to be coupled between a first peripheral and a processor, the switch device to be coupled to the first peripheral by a first interconnect of a first communication protocol and to the processor by a second interconnect of the first communication protocol, where the first communication protocol provides for cache coherent transactions and non-cache coherent transactions, the switch device including cache coherency logic to handle cache coherent transactions from the first peripheral to the processor, wherein the first peripheral does not include cache coherency logic to handle cache coherent transactions.

2. The apparatus of claim 1, wherein the switch device further comprises routing logic to enable transmission of transactions between the first peripheral and a second peripheral coupled to the switch device by a third interconnect of the first communication protocol, without transmission of the transactions on the second interconnect.

3. The apparatus of claim 1, wherein the switch device is to snoop cache transactions of the processor and to invalidate data in a cache of the processor if the corresponding cache transaction corresponds to an address of a cache coherent transaction present in the switch device received from the first peripheral and destined to the processor.

4. The apparatus of claim 1, wherein the switch device includes an upstream buffer to store transactions from the first peripheral to the processor, and a downstream buffer to store transactions from the processor to the first peripheral.

5. The apparatus of claim 1, wherein the switch device is to provide data of a direct memory access transaction from the first peripheral directly into a cache memory of the processor and without writing of the data to a memory associated with the processor.

6. The apparatus of claim 1, wherein the first communication protocol comprises a point-to-point communication protocol.

7. A method comprising:
receiving in a switch, from a first peripheral device coupled to the switch, a transaction directed to a processor coupled to the switch;

determining in the switch if the transaction is a cache coherent transaction and if so, performing coherent-related transactions related to the cache coherent transaction including snooping cache transactions of the processor and invalidating a location in a cache of the processor corresponding to the cache coherent transaction if the cache coherent transaction is destined for the location, wherein the switch and the first peripheral device are native devices of a first communication protocol, and the first peripheral device does not include cache coherency logic to perform the coherent-related transactions; and after handling responses to the coherent-related transactions in the switch, forwarding the transaction to the processor.

8. The method of claim 7, further comprising forwarding the transaction to the processor from the switch if the transaction is a non-coherent transaction without snooping the cache transactions.

9. The method of claim 7, further comprising forwarding a second transaction from the first peripheral device destined for a second semiconductor device coupled to the switch by an interconnect without sending the second transaction to the processor.

10. The method of claim 7, further comprising performing the determination of whether the transaction is a cache coherent transaction in cache coherency logic of the switch.

11. The method of claim 7, further comprising transmitting, from the switch directly into the cache of the processor, data of a direct memory access transaction from the first peripheral device, without writing of the data to a memory associated with the processor.

12. A system comprising:
  a first processor node to perform operations on data and including a plurality of cores and a memory controller to couple with a first memory;
  a first peripheral device including non-coherent logic to handle non-coherent transactions and first logic to issue cache coherent transactions but not to handle the cache coherent transactions;
  a switch device coupled to the first peripheral device by a first point-to-point interconnect of a first communication protocol and to the first processor node by a second point-to-point interconnect of the first communication protocol, where the first communication protocol provides for cache coherent transactions and non-cache coherent transactions, the switch device including second logic to handle the cache coherent transactions from the first peripheral device;
  a second processor node to perform operations on data and including a plurality of cores and a memory controller to couple with a second memory; and
  a chipset coupled to the second processor node by a third point-to-point interconnect of the first communication protocol.

13. The system of claim 12, further comprising a third peripheral device coupled to the chipset by a first interconnect of a second communication protocol, wherein the second communication protocol does not provide for cache coherent transactions.

14. The system of claim 13, wherein the chipset is to translate transactions of the third peripheral device from the second communication protocol to the first communication protocol and to send the transactions to the second processor node.

15. The system of claim 13, wherein the second communication protocol is a peripheral component interconnect protocol.

16. The system of claim 13, further comprising a fourth peripheral device coupled to the switch device by a fourth point-to-point interconnect, wherein the switch device is to communicate a peer transaction between the first peripheral device and the fourth peripheral device without communication of the peer transaction on the second point-to-point interconnect.

17. The system of claim 12, wherein the switch device further comprises routing logic to enable transmission of transactions between the first peripheral device and a fourth peripheral device coupled to the switch device by a fourth interconnect of the first communication protocol, without transmission of the transactions on the second interconnect.

18. The system of claim 17, wherein the switch device is to snoop cache transactions of the first processor node and to invalidate data in a cache of the first processor node if the data corresponds to an address of a cache coherent transaction present in the switch device received from the first peripheral device and destined to the first processor node.

19. The system of claim 12, wherein the switch device is to provide data of a direct memory access transaction from the first peripheral device directly into a cache memory of the first processor node and without writing of the data to a memory associated with the first processor node.

* * * * *